(No Model.)
H. HARDY.
ADJUSTABLE COLUMN OR STAND FOR STOOLS, &c.
No. 314,831. Patented Mar. 31, 1885.
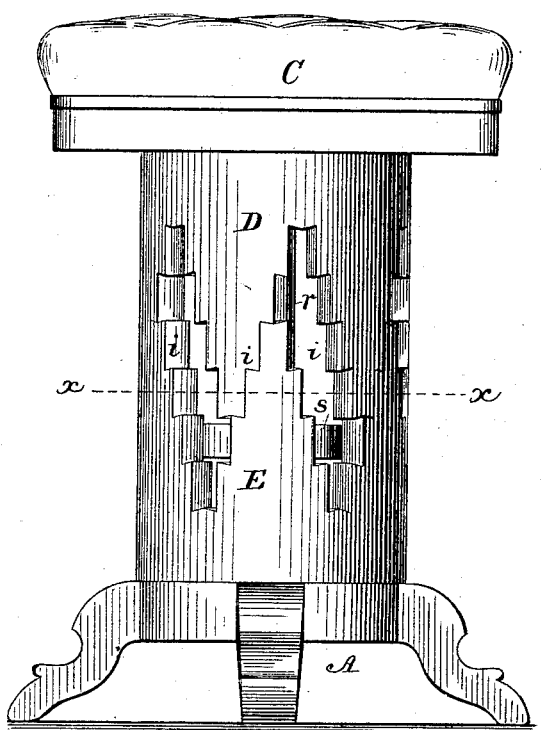
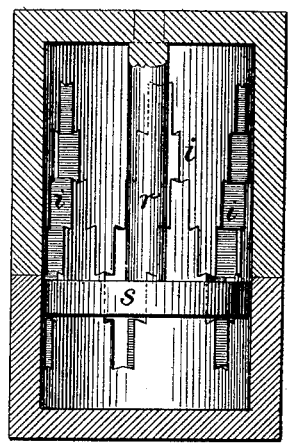
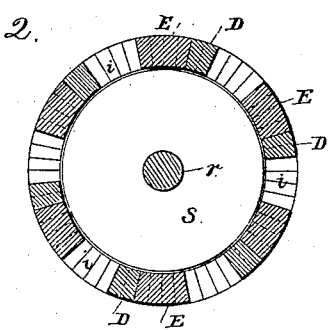
Witnesses
Chas H Smith
J. Staib
Inventor
Hippolyte Hardy
for
Lemuel W. Serrell
atty

UNITED STATES PATENT OFFICE.

HIPPOLYTE HARDY, OF NEW YORK, N. Y.

ADJUSTABLE COLUMN OR STAND FOR STOOLS, &c.

SPECIFICATION forming part of Letters Patent No. 314,831, dated March 31, 1885.

Application filed February 16, 1884. (No model.)

*To all whom it may concern:*

Be it known that I, HIPPOLYTE HARDY, of the city and State of New York, have invented an Improvement in Adjustable Columns or Stands for Stools, Seats, Music-Racks, &c., of which the following is a specification.

This column is cylindrical and made in two parts. The line of separation between the upper and lower parts is a series of steps. When the column is set at the shortest position the two parts of the cylindrical column come close together. By raising the upper part of the column and giving it a partial rotation, the steps are brought to bear upon each other, and in this manner the column can be lengthened out step by step, or it can be reduced in height by the reverse movement. This column can be made very strong and ornamental, and when made of a wooden cylinder it can be sawed out, the cylinder being turned while being sawed, so that the saw always is in a radial position to the segment of the cylinder that is being sawed out, thereby insuring the proper matching of the respective steps as they may be raised or lowered.

In the drawings, Figure 1 is an elevation of the stool complete. Fig. 2 is a section of the column at the line $x$ $x$, and Fig. 3 is a vertical section.

The base A and stool-seat or upper part, c, are of any desired character, and are adapted to any given use. The column is cylindrical or tubular. The upper part, D, and lower part, E, are of the same diameter, and usually they will be made in one and sawed apart; but the parts may be made of metal, papier-maché, or other suitable material by means of molds or otherwise. The line in which the separation is effected is a series of inclined or diagonal zigzags or steps, as seen at $i$ $i$. These steps are preferably arranged in pyramidal form, as shown; but they may be in the form of a half-pyramid, one line being vertical, the next an inclined zigzag.

The manner in which the column can be elongated will be apparent on inspection, for by lifting the upper part of the column and giving the same a partial rotation the inverted steps of the upper part will be made to take a bearing upon the steps of the lower part and support the same firmly and reliably. The surfaces of the steps should be at an inclination, as shown, so that there is no risk of the steps slipping off each other.

The upper part of the tubular column may be provided with an interior guide passing down into the hollow lower part of the column or the reverse. I have shown the central stem, $r$, and disk $s$ forming these guides to keep the parts of the column from lateral movement.

I claim as my invention—

1. A two-part column, the lines of separation being inclined zigzags forming steps, so that the column can be lengthened or shortened, the steps taking bearings upon each other to support the weight upon the column, substantially as set forth.

2. The two-part column formed of a hollow cylinder, the lines of separation between the two parts being inclined zigzags or steps, in combination with a guide within the tubular column, substantially as set forth.

Signed by me this 13th day of February, A. D. 1884.

H. HARDY.

Witnesses:
GEO. T. PINCKNEY,
WILLIAM G. MOTT.